W. M. GENTLE.
COMPRESSING MACHINE.
APPLICATION FILED NOV. 6, 1907.
915,424.
Patented Mar. 16, 1909.
10 SHEETS—SHEET 2.
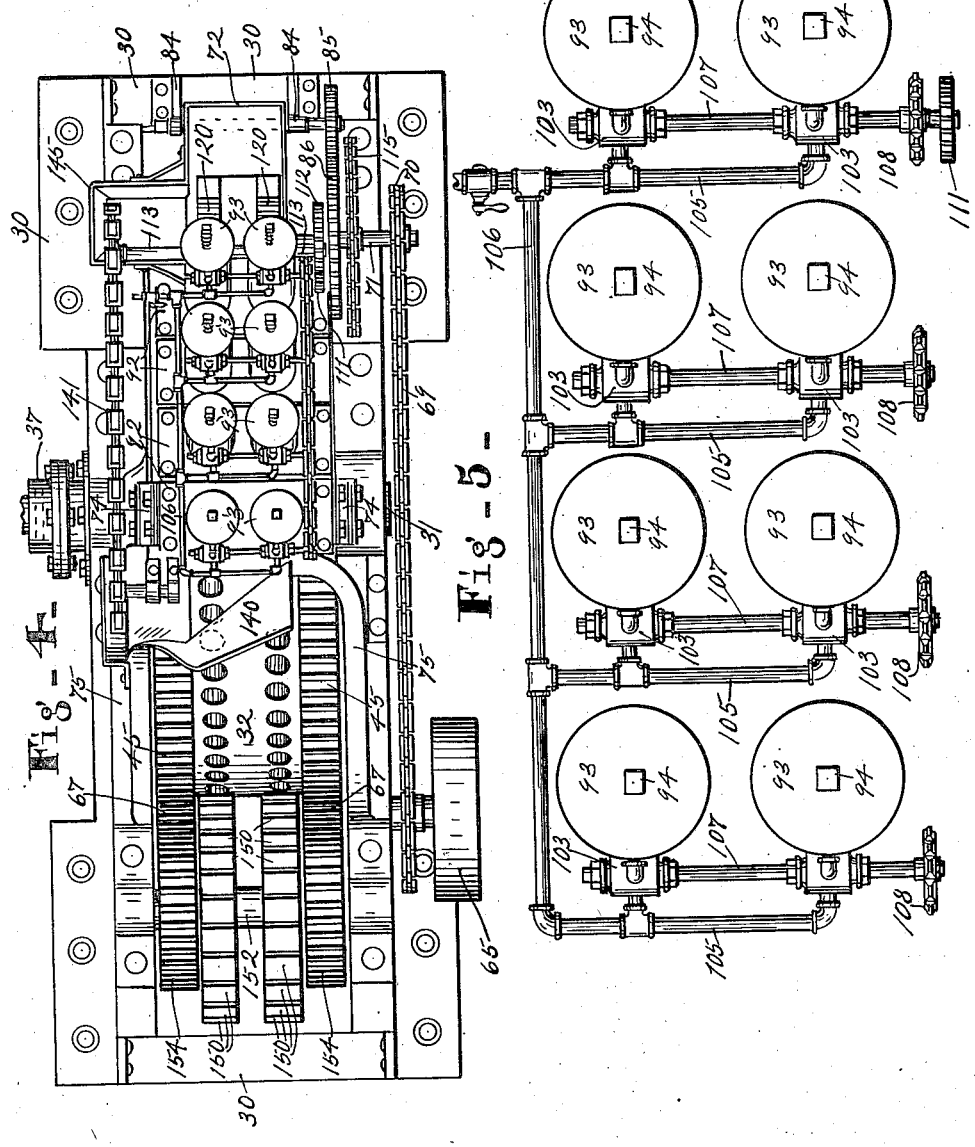
WITNESSES:
N. Allemong
Olive Breeden
INVENTOR.
William M Gentle.
BY
V. H. Lockwood
ATTORNEY.

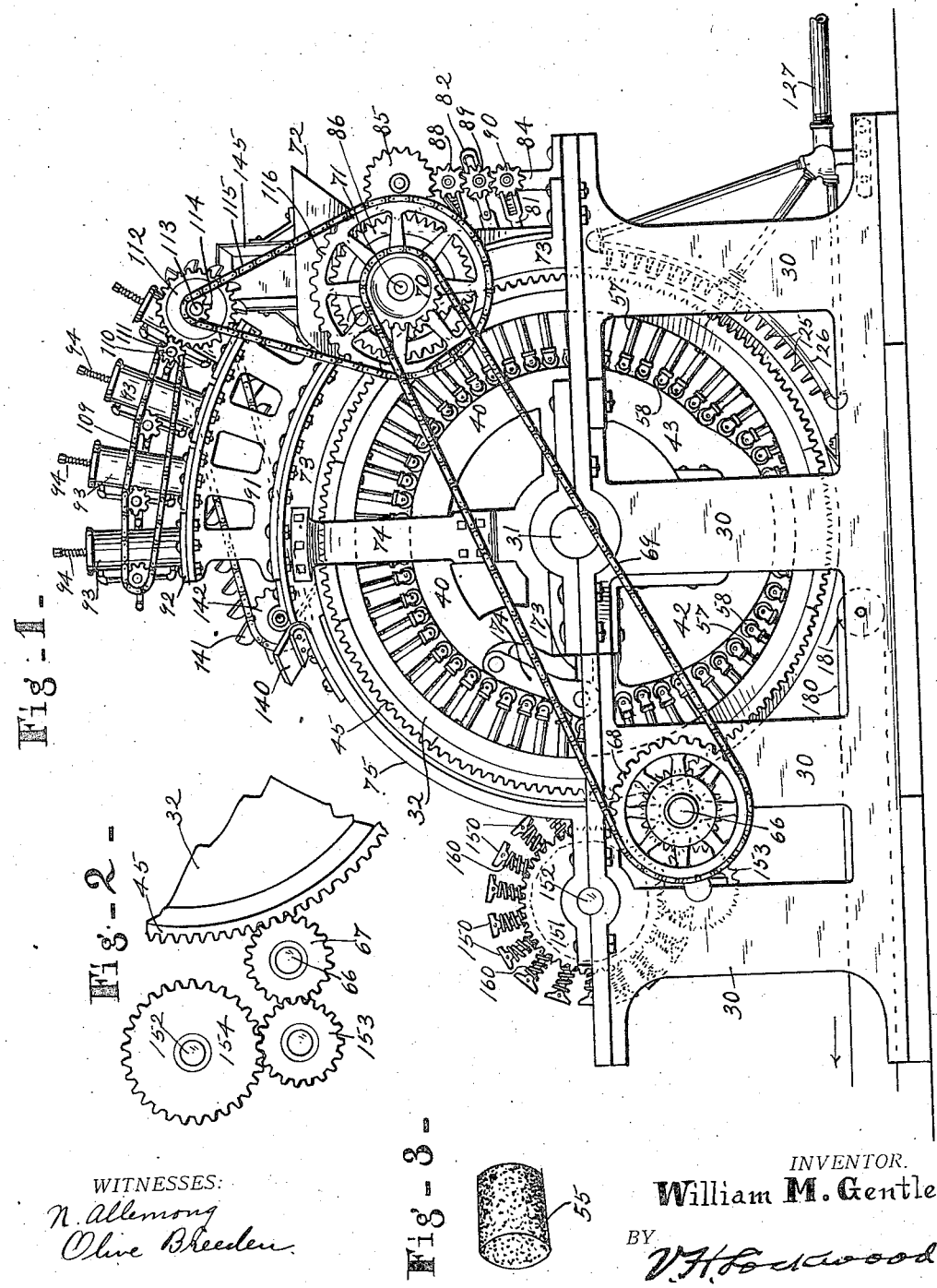

W. M. GENTLE.
COMPRESSING MACHINE.
APPLICATION FILED NOV. 6, 1907.
915,424.
Patented Mar. 16, 1909.
10 SHEETS—SHEET 3.
Fig-6-
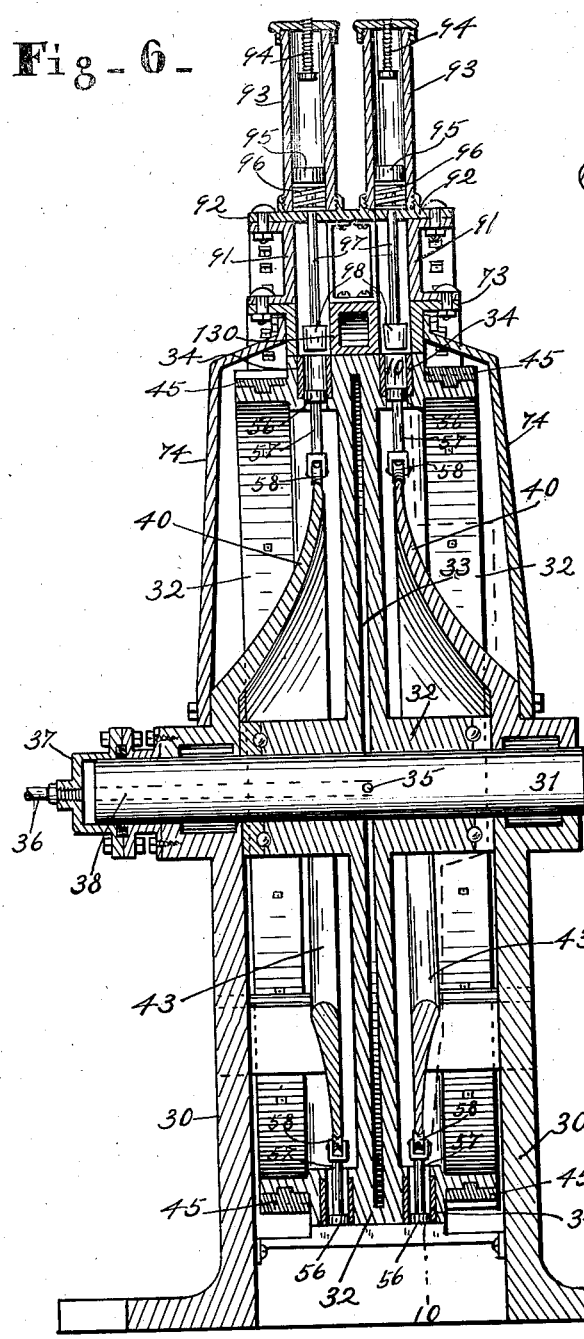
Fig-7-
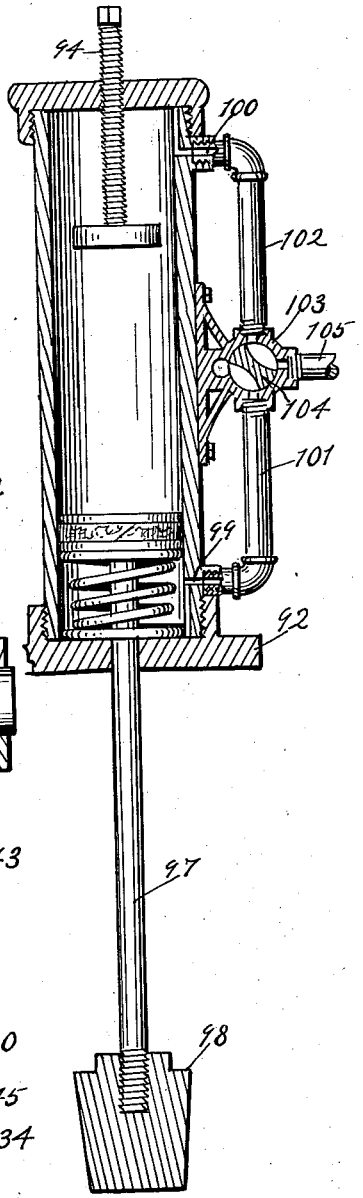
WITNESSES:
N. Allemong
Olive Bredsten
INVENTOR.
William M. Gentle
BY
V. H. Lockwood
ATTORNEY.

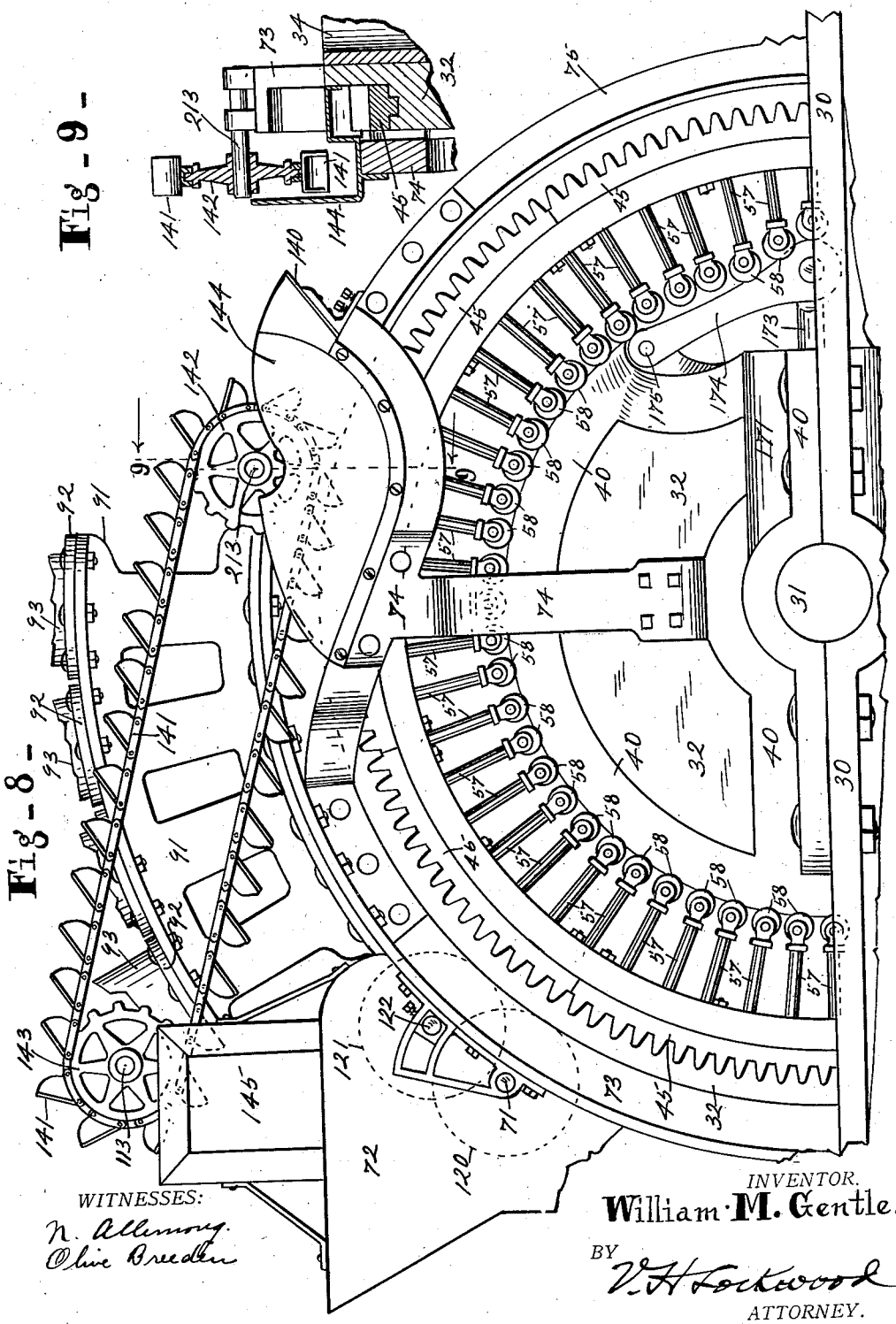

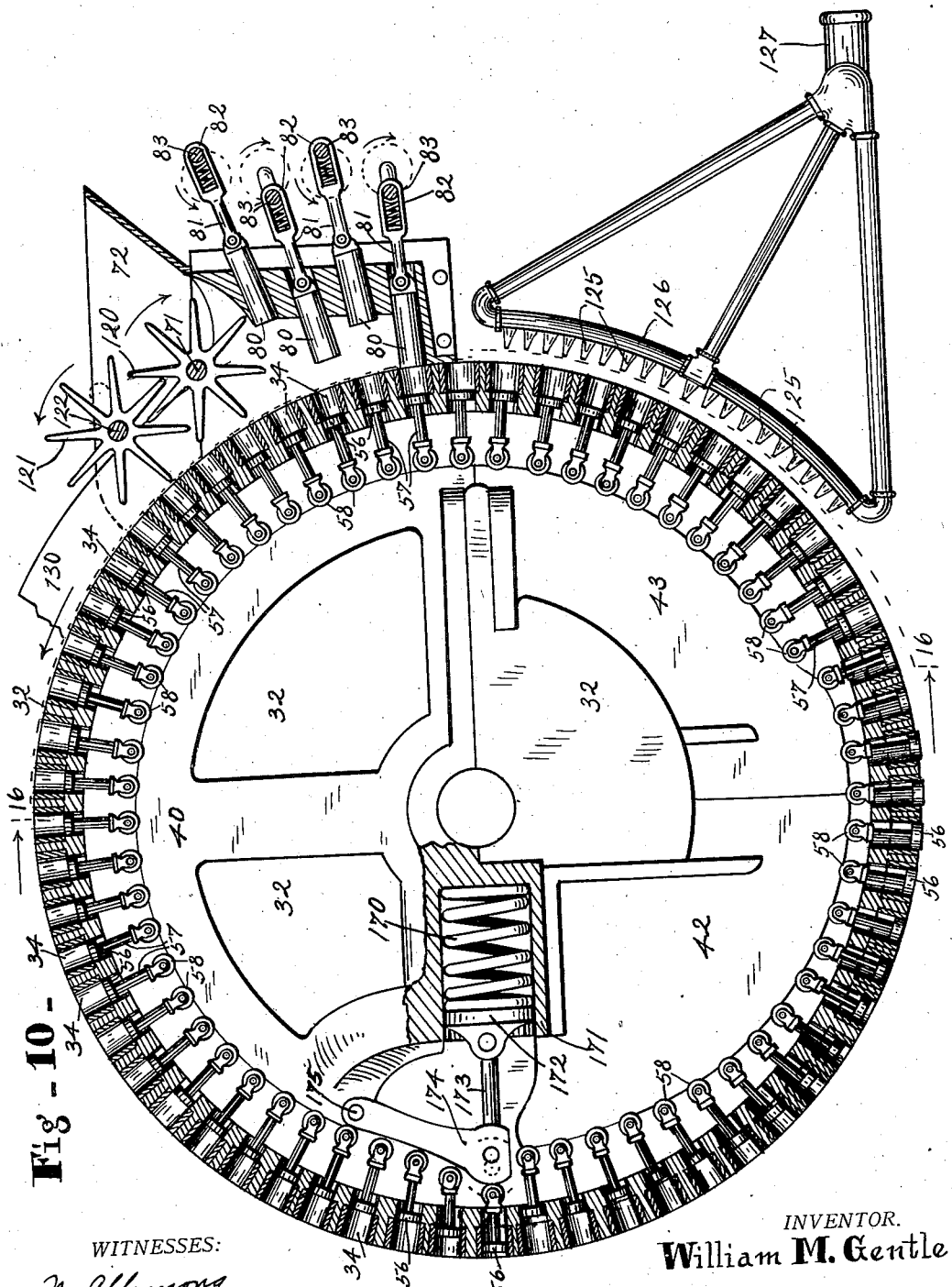

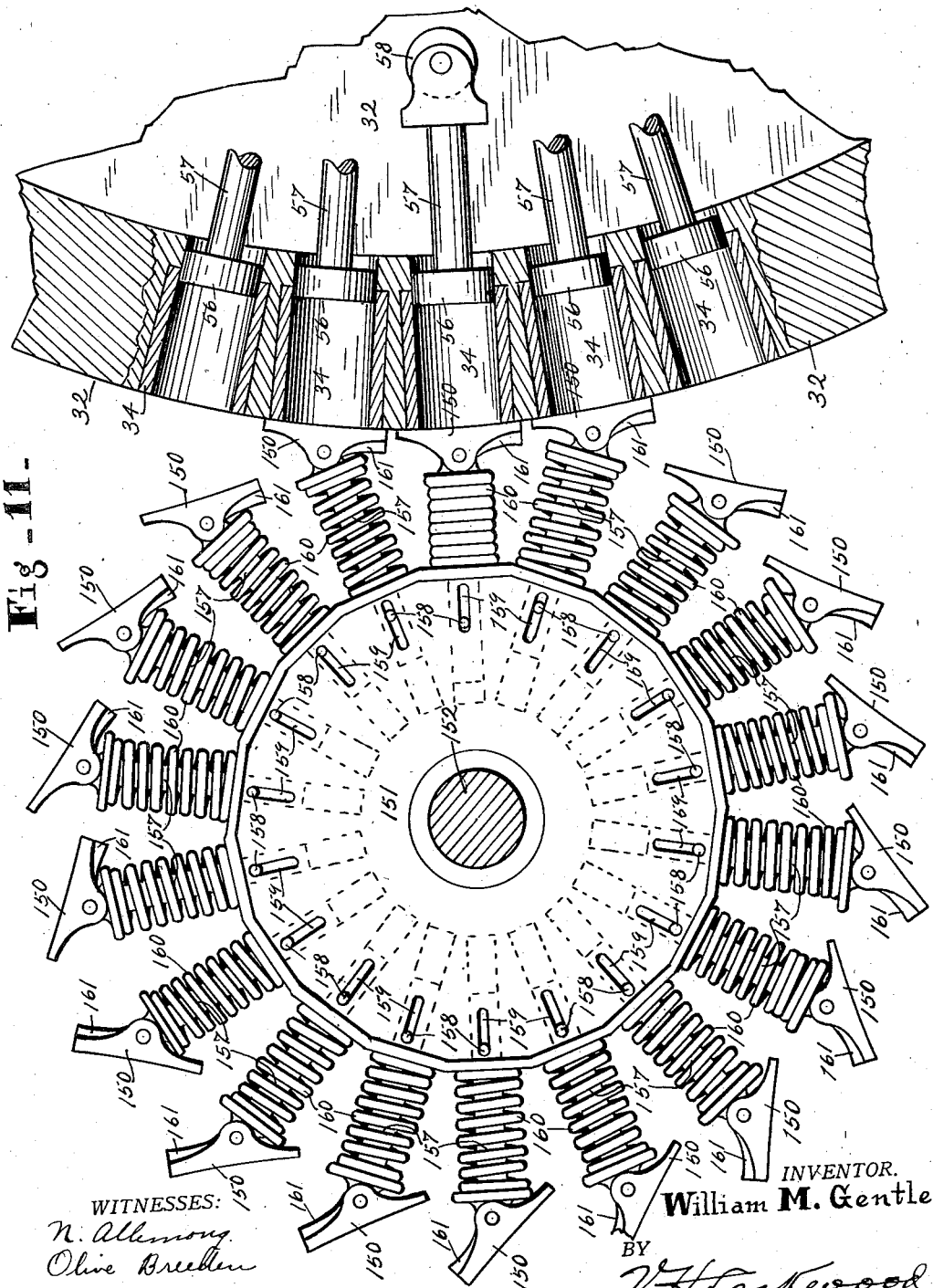

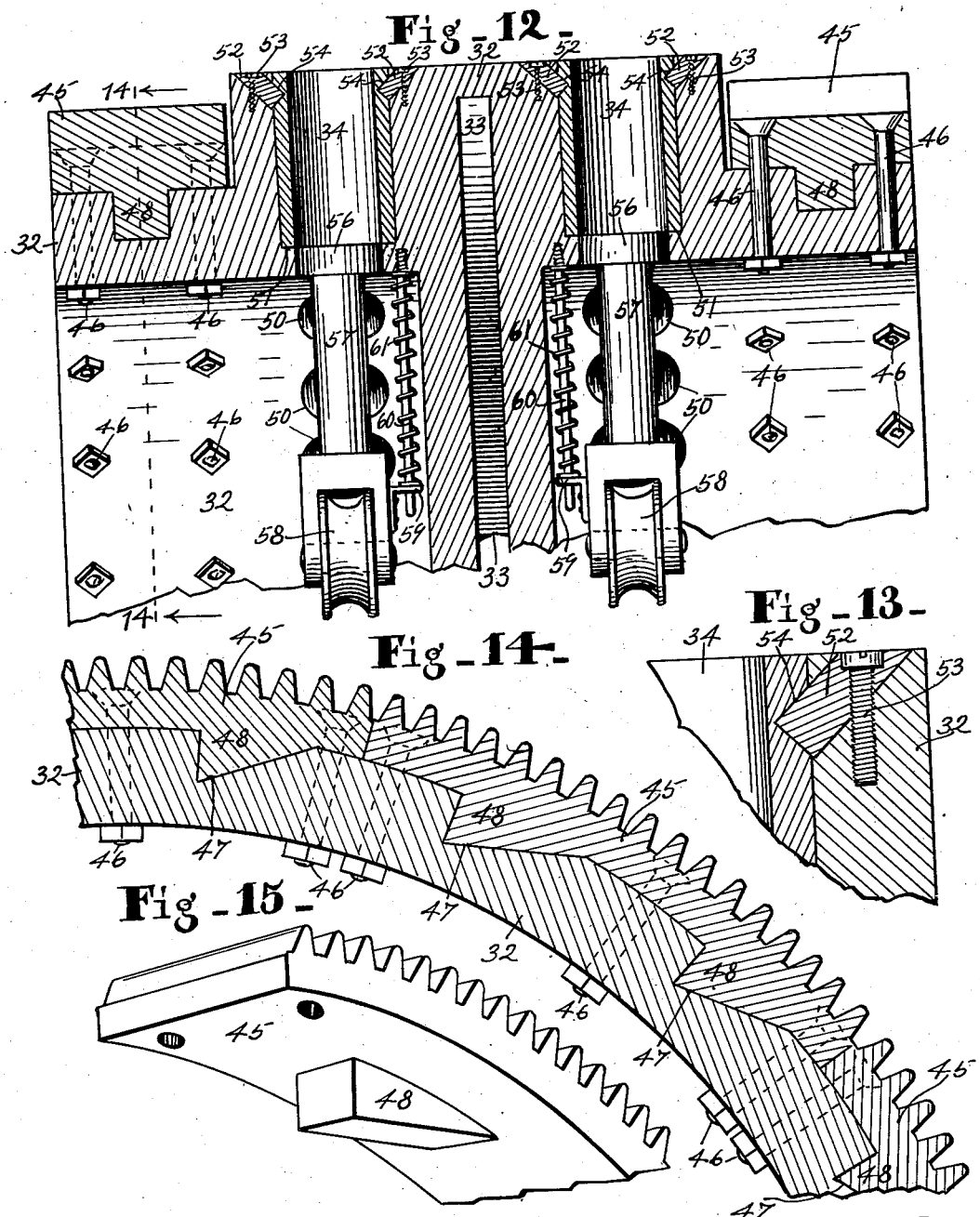

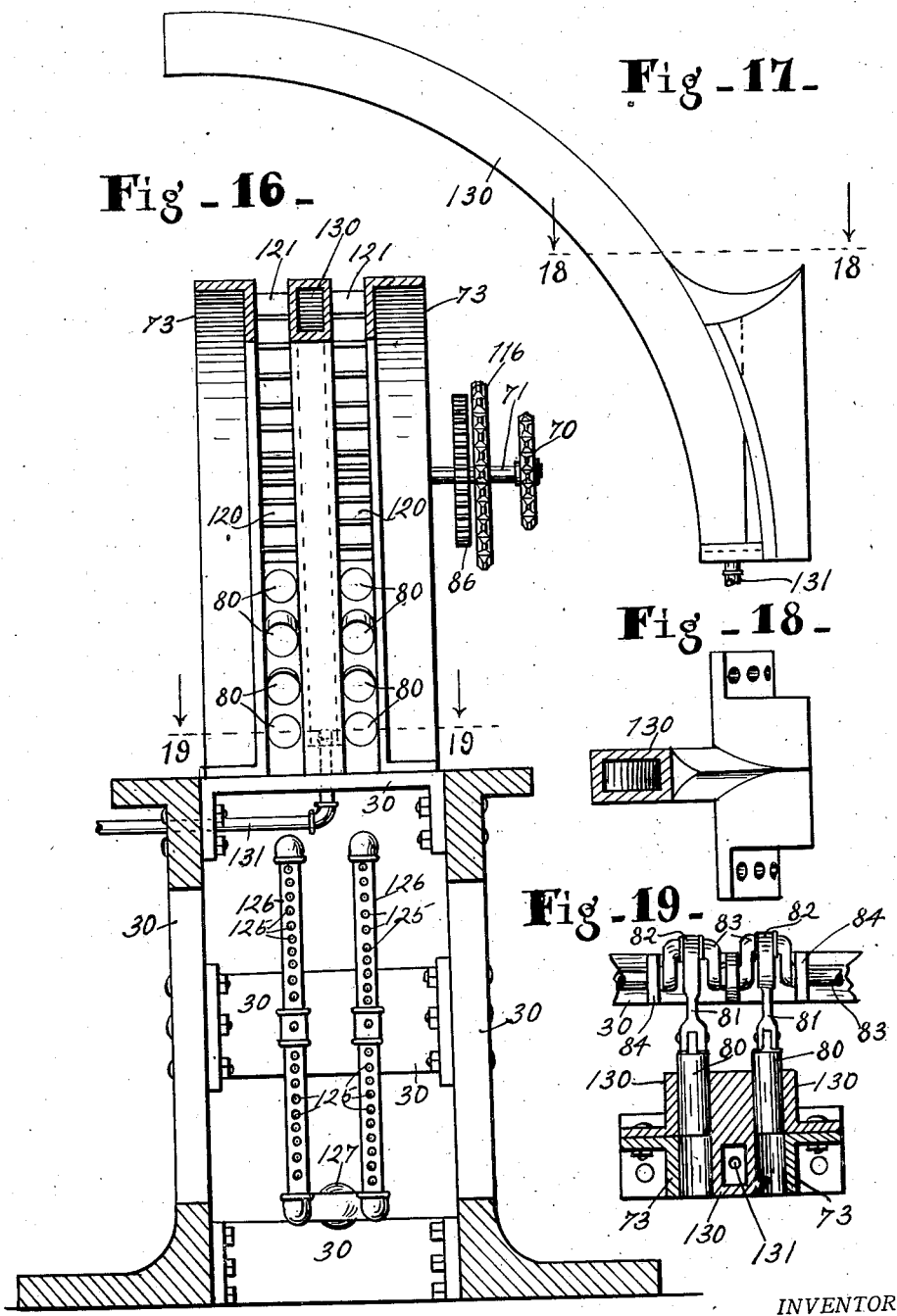

W. M. GENTLE.
COMPRESSING MACHINE.
APPLICATION FILED NOV. 6, 1907.
915,424.
Patented Mar. 16, 1909.
10 SHEETS—SHEET 9.
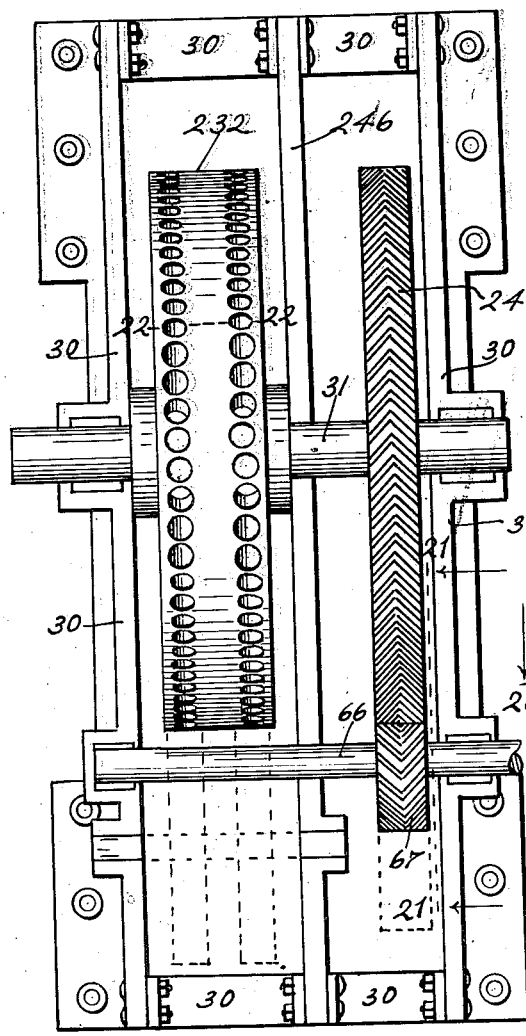
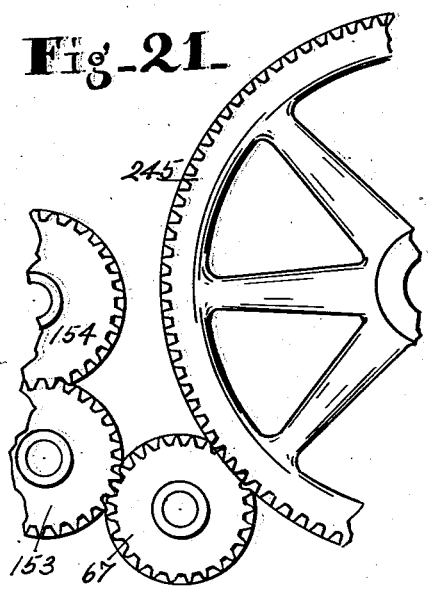
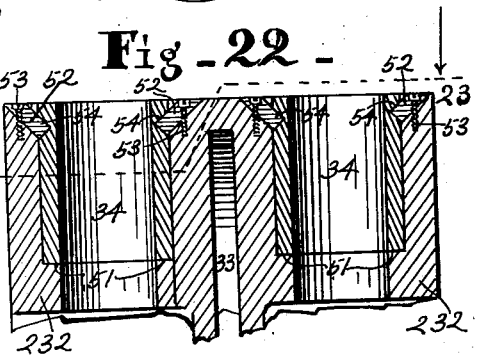
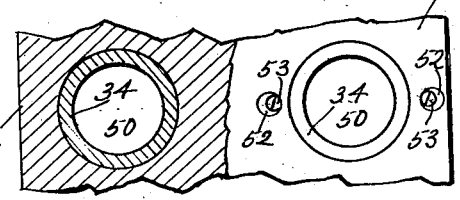
WITNESSES:
N. Allemong.
Olive Brekden
INVENTOR.
William M. Gentle.
BY V. H. Lockwood
ATTORNEY.

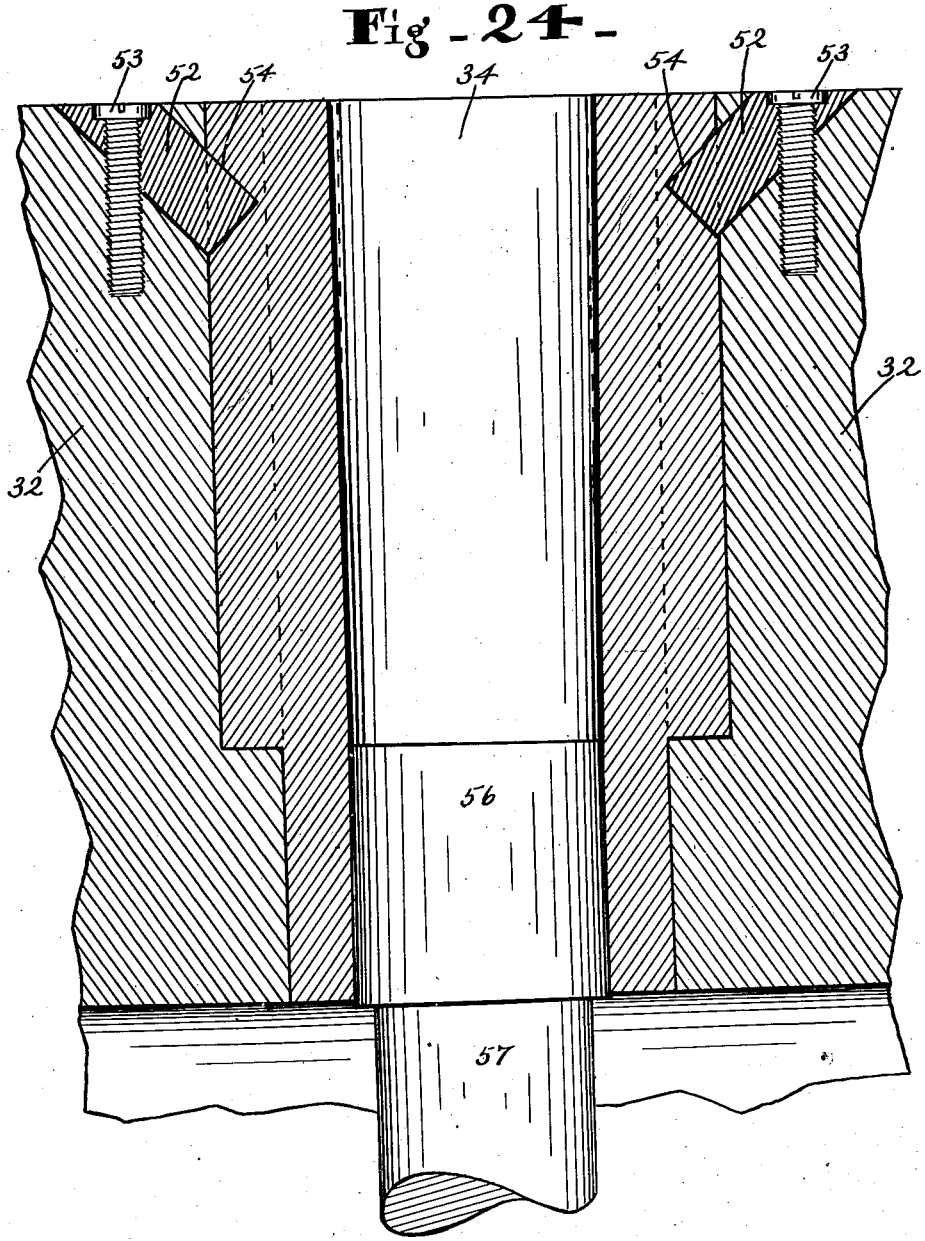

UNITED STATES PATENT OFFICE.

WILLIAM M. GENTLE, OF INDIANAPOLIS, INDIANA, ASSIGNOR OF ONE-HALF TO GEORGE W. LADLEY, OF INDIANAPOLIS, INDIANA.

COMPRESSING-MACHINE.

No. 915,424.   Specification of Letters Patent.   Patented March 16, 1909.

Application filed November 6, 1907. Serial No. 400,938.

*To all whom it may concern:*

Be it known that I, WILLIAM M. GENTLE, of Indianapolis, county of Marion, and State of Indiana, have invented a certain new and useful Compressing-Machine; and I do hereby declare that the following is a full, clear, and exact description thereof, reference being had to the accompanying drawings, in which like numerals refer to like parts.

The object of this invention is to provide improved construction of machines for forming briquets or compressing various kinds of material.

One feature of the invention consists in providing a series of removable molds radially disposed in the rim of a rotatable wheel and means for compressing the material in said molds while the wheel is moving. In connection with the foregoing there is the further idea of the molds in the rim being open in the outer ends and the rim of the wheel passing through a hopper containing material to be compressed, whereby the molds will become charged. Associated with the hopper is improved means for tamping the material into the molds.

Another feature of the invention consists, in connection with such molds, of an individual compressor for each mold that closes the inner end of the mold and carried by the mold wheel and actuated by cams on the frame and within the wheel and over which rollers on the inner ends of the compressors ride. Springs are provided for holding the compressors always in engagement with said cam.

Another feature of the invention consists in combining with such a mold wheel having internally mounted compressors, of an external rotatable wheel carrying a series of mold-closing plates movable tangentially with the mold wheel for closing the outer ends of the molds thereof at the compressing point. This enables the compression to take place while the wheels are moving. These mold closing plates are radially actuated by springs that are pivoted so as to conform to the periphery of the mold wheel and weighted so that they will normally move into the proper position to close the molds.

Another feature of the invention consists in providing means for scraping off the surplus material from the periphery of the mold wheel after the wheel has passed through the hopper and for receiving and conveying said surplus material back to the hopper.

Another feature of the invention consists in a novel construction of means for heating the rim of the wheel and the molds therein.

The full nature of my invention will be understood from the accompanying drawings and the following description and claims.

In the drawings Figure 1 is an elevation of one side of the machine. Fig. 2 is a detailed view of the driving mechanism, one gear being partly broken away. Fig. 3 is a perspective view of a briquet such as is made with this machine from slack coal. Fig. 4 is a plan view of the machine. Fig. 5 is a plan view on a larger scale of the steam tamping mechanism shown in Fig. 4 and the steam connections. Fig. 6 is a central vertical section through the machine with some parts omitted. Fig. 7 is a central longitudinal section of one of the tamping mechanisms shown in Fig. 6 but on a larger scale. Fig. 8 is an elevation of the upper part of the machine on the side opposite of that shown in Fig. 1, with parts broken away. Fig. 9 is a transverse section on the line 9—9 of Fig. 8. Fig. 10 is a vertical section of the mold wheel on the line 10—10 of Fig. 6 and some of the adjacent parts, parts being broken away. Fig. 11 is a side elevation of the mold box closing wheel and a vertical section through a portion of the mold wheel. Fig. 12 is a transverse section through the upper part of the mold wheel, with other parts removed and through one pair of compressors, the internal periphery of a portion of the wheel being shown in perspective. Fig. 13 is a detail on a larger scale than shown in Fig. 12 of the means for removably securing a mold in the mold wheel. Fig. 14 is a section on the line 14—14 of Fig. 12. Fig. 15 is a perspective view of one end of a gear section of the gear shown in Fig. 1. Fig. 16 is a section on the line 16—16 of Fig. 10, showing some parts in elevation. Fig. 17 is a side elevation of a portion of the mold heating chamber shown in Fig. 16. Fig. 18 is a horizontal section on the line 18—18 of Fig. 17. Fig. 19 is a section on the line 19—19 of Fig. 16. Fig. 20 is a plan view of a modified form of the mold wheel, showing the gear portions thereof separated. Fig. 21 is the same as the driving mechanism shown in Fig. 2 adapted for the modified form shown in Fig. 20. Fig. 22 is a section on the line 22—22 of Fig. 20. Fig. 23 is a view half in section and half in plan on the line 23—23 of Fig. 22. Fig. 24 is a central vertical section through a mold and a portion of the rim of the wheel on a large scale, parts being broken away.

The movable mechanism in the machine is mounted upon a suitable rectangular frame 30 substantially as shown in Figs. 1 and 4. In said frame, as shown in Fig. 6, a spindle 31 is mounted transversely on the frame and to it the mold wheel 32 is rigidly secured, being preferably shrunk thereon. This wheel consists of two separate hub portions that are shrunk on the spindle 31 and from each of them there is a radially extending web leaving a space 33 between them, as shown in Fig. 6, and there is a widened rim in which two annular series of molds 34 are mounted. These molds extend radially. As seen in Fig. 6 by dotted lines there is a passage way 38 longitudinally of the spindle 31 for about one-half its length and centrally of the spindle, that, through the hole 35, communicates with the chamber 33 in the wheel 32. This is for the purpose of heating the wheel 32, steam being supplied therefor through the steam pipe 36 connected with the cap 37 which is fastened to the frame about the spindle.

On each side of the wheel 32, as shown in Figs. 1 and 6, there is an upwardly extending cam 40 from the frame and projecting inwardly below the rim of the wheel, the edges of said cam 40 being in radial alinement with the molds 34 in the rim of the wheel. There are also downwardly extending cams 42 and 43 secured to the frame, as shown in Fig. 1, and having also their edges in alinement with the molds 34 in the rim of the wheel below. The function of these cams will be explained later.

The construction of the rim of the mold wheel 32 appears best in Fig. 12. On each side of the central heating chamber 33 there is a series of molds 34 and on each side of the molds there are gear sections 45 secured by bolts 46, as appears in Figs. 12 and 14. Where the gear sections 45 are secured on the rim of said wheel, the rim is provided with notches 47, as shown in Fig. 14, to receive lugs or shoulders 48 extending inwardly from the gear sections 45. There are a number of the gear sections 45 thus mounted on the wheel to form two continuous gears. This construction is thus arranged to enable any section to be removed and be replaced in case any of the gear teeth should be torn out or damaged, and avoid the necessity in such instance of replacing the entire wheel 32. And yet with this easy means of repairing the gear on the wheel 32, this gear construction is a very strong one.

As shown in Figs. 12 and 13, the molds 34 are tubular and open at both ends and they fit in a suitable series of holes 50 in the rim, the inner ends of the molds resting upon shoulders 51, as seen in Fig. 12. The molds are held in place by the locking blocks 52, that are secured by screw bolts 53 in inclined positions in the rim of the wheel so that the inner ends of said locking blocks may project into corresponding recesses 54 in the external wall of the mold. This renders said molds readily removable for repairing and the molds may be replaced by other molds if it is desired to vary the sizes of the briquets formed. The briquet 55 made by this machine, see Fig. 3, will be of the same diameter as the mold 34. Within said molds there are radially operating compressors consisting of a piston 56, piston rods 57 and rollers 58 mounted on the inner end of the piston rod, as appears in Fig. 12. The inner end of the piston rod 57 is guided in its reciprocatory movement by the eye 59 riding on the guide rod 60 secured to the inner surface of the rim and about which there is a spring 61 pressing against the eye 59 that tends to force the compressor inwardly. As seen in Figs. 1, 6, 8, 10 and 11 the rollers 58 on the compressors ride upon the cams 40, 42 and 43.

The means for driving the big mold wheel is shown in Figs. 1, 2 and 4. As appears in the latter figure, there is a driving pulley 65 to which power is supplied from any suitable source, said driving pulley being mounted on the horizontal shaft 66, which carries the pinions 67, one on each side of the machine. And the pinions 67 mesh with the gears 45 on the big mold wheel 32 and thereby drives the same. On the same shaft 66 outside the frame there is a sprocket wheel 68 from which a sprocket chain 69 runs to the sprocket wheel 70 of the mechanism for feeding and tamping the slack coal or other material into the molds. The pinion 70 is on a shaft 71, see Fig. 4, that extends horizontally through the hopper 72, see Fig. 10. As shown in the latter figure the hopper is mounted on the arching quadrant angle bars 73, seen in Fig. 16, said arch bars being secured at their lower ends upon the frame, as shown in Fig. 1 and the upper ends thereof are supported by the braces 74 extending up from the cam 40 on each side of the mold wheel. There are also arch bars 75 on the left hand side of the wheel, see Fig. 1, secured at their lower ends upon the frame of the machine and at their upper ends to the upper ends of the arch bars 73 and to the post 74. This construction forms two semi-circular frames on each side of the upper half of the mold wheel and just above the gears on said wheel. Therefore, the hopper 72, as seen in Fig. 10, is mounted above the horizontal line through the axis of the large mold wheel and extends upward enveloping about one-fifth of the periphery of said wheel. This hopper is filled with slack coal and mechanism is provided to assist gravity in charging the molds with said slack as the mold wheel continuously revolves. Obviously the coal slack is ground or minimized before being placed in the hopper. This material is driven in the molds by a series of tampers 80 mounted in the walls of the hopper, which is made thick for that purpose, as shown in Fig. 10. There are four of these tampers for each of the two series of molds in the mold wheel, the four tampers being arranged in a vertical series, one over the other. Their object is to push the coal or comminuted material toward and into the molds. They are actuated by connecting rods 81 with slotted ends 82 through which a crank shaft 83 extends, there being in each loop or slot a spring acting between the crank shaft 83 and the connecting rod 81 to yieldingly hold the tamper inward as the crank shaft operates. Without this yielding means, the mechanism would scarcely be operable because the coal might be packed in so tightly that a particular tamper at a particular time could not be moved very much. There are four of the crank shafts 83, one for each horizontal pair of tampers that are mounted in the pair of posts 84 extending upwardly from the frame, see Fig. 1, and connected with the tampers as shown in Figs. 10 and 19. The crank shafts are driven by a gear 85 secured on the upper shank shaft that meshes with the gear 86 on shaft 71, see Figs. 1 and 4. The gear 85, see Fig. 1, meshes with a pinion 88 on the next lower crank shaft, which in turn meshes with pinion 89 and it in turn with pinion 90. With this train of gears the crank shafts operate simultaneously.

There is a second set of tampers mounted higher up on the mechanism and adapted to tamp the comminuted material in and upon the molds after they have passed through the hopper. That mechanism appears in Figs. 1, 6 and 7. A frame 91 is mounted upon each of the quadrant-shaped angle bars 73, as seen in Fig. 6, and the transverse plate 92 is secured upon the two frames 91 and upon it two series of tampers four each, are mounted. These tamping devices are steam actuated and consist of the cylinders 93 with the buffer 94 at the upper end and the piston 95 in said cylinder acting against the spring 96 therein and propel toward the molds the rod 97 and the tamping head 98. This device is shown in large size in Fig. 7 and steam is supplied through the two ports 99 and 100 by the steam pipes 101 and 102 leading from the valve casing 103 having in it the rotary valve 104, said valve casing having steam supplied to it through the steam pipe 105. Steam pipes 105, see Fig. 5, lead from the common pipe 106, through which steam is supplied from any suitable source. The rotary valves 104 on each pair is operated by a valve rod 107, that carries on one end a sprocket wheel 108, the sprocket wheels for all four of the pairs of valves being in line with each other, see Fig. 5, and carrying a sprocket chain 109, see Fig. 1, and actuated by the pinion 111 on the valve rod 107 and gear 112 on shaft 113, driven by a pinion 114 thereon. The sprocket chain 115 runs from the sprocket wheel 116 on shaft 71, see Fig. 1. The shaft 113 is mounted on the two rear cylinders 93. The function of the chain 109 is to turn the valves 104 to control the supply of steam to the cylinders 93.

In the hopper the comminuted material is fed down into the same and kept agitated by a star wheel 120 on the shaft 71. There is also another star wheel 121 mounted as an idler on the spindle 122 that meshes loosely with the star wheel 120 for the purpose of keeping the latter clean and preventing the clogging of material in it.

In order to make the device operate well in compressing the material, especially in making briquets, where some pitch is used, it is desirable that the parts be kept quite warm or heated. I have already explained about heat being introduced in the chamber 33 in the middle of the wheel, see Fig. 6. As seen in Fig. 10, a series of gas jets 125 arranged in close proximity to each mold so the flame therefrom will be directed into the molds just before the molds reach the hopper, whereby they will be very hot when they enter the hopper. The gas jets are on a triangular gas pipe 126 leading from the main gas pipe 127. Furthermore, there is a heating chamber 130, see Figs. 6 and 16. It is a tube, rectangular in cross-section that extends about one-fourth of the way around the mold wheel and midway of the periphery of the wheel and parallel with the quadrant-shaped bar 73. Steam is supplied to that heating pipe 130 by the steam pipe 131, see Figs. 16 and 17.

I have now described the means for heating the molds and rim of the wheel so that the pitch or any other material for cementing the particles together will be pliable and I have also explained how the molds while they are moving are filled with the material, such as slack coal. Of course with the means so far described the coal would more than fill the molds, as it would be heaped up on them and project outwardly beyond the mouths of the molds. In order to remove this surplus and level the material in the molds, I provide a leveler or scraping device 140, see Figs. 1 and 4, that is secured upon the bars 75 with the scraping edge coming down upon the periphery of the mold wheel and arranged obliquely thereof, as shown in Fig. 4. The material which it scrapes off from the molds and periphery of the wheel is taken up by the conveyer 141, which is an endless chain with boxes, the same being mounted and carried by sprocket wheels 142 and 143, see Fig. 8. The latter sprocket wheel 143 is mounted on shaft 113 and driven thereby, while the former wheel 142 is mounted on a spindle 213 which has bearings in the frame bars 73. That conveyer operates in the scoop on one side of the device in position to receive the material from the scraper 140. The conveyer 141 discharges surplus material back into the hopper. There is a side board 145 for guiding the material from the conveyer 141 into said hopper. As the wheel revolves away from the hopper and tamping devices thus explained, all of the molds are tamped full of the material to be compressed and the same is compressed into briquets or the like when the wheel has made about one-fourth of a revolution after leaving the last tamping device, and when the molds are in substantially horizontal position, as shown in Figs. 10 and 11. At that point the outer opening of the molds is closed by the plates 150 on the mold closing wheel 151 carried on the shaft 152 mounted on the frame of the machine. This wheel carries a considerable number of the mold closing devices, so spaced as to accurately cover and close said molds as the two wheels are rotated. The mold closing wheel 151 is positively actuated by the pinions 153, see Fig. 2, that are driven by the pinions 67 and the pinions 153 in turn drives the gears 154 that are secured on shaft 152. The wheel 151 has radial sockets, see dotted lines Fig. 11, into which shanks 157 of the mold closing plates 150 project. Said shanks are held in said sockets by the pins 158 that project through the radial slots 159. A spring 160 is coiled about said shank 157 that permits the plate 150 to be pressed by the mold wheel radially toward the center of the wheel 151, as shown in Fig. 11, and the plates 150 are centrally fulcrumed to the outer ends of the shanks 157 so that said plates may turn slightly as required while they press against the mold wheel. In order to close the molds tightly the outer surface of the plates 150 are curved to the same degree as the periphery of the mold wheel. By the foregoing mechanism every mold, as it comes around, is closed by a yielding means, which, however, is actuated by a very strong spring so that it prevents the material in the molds from escaping while the compressor operates.

The plate 150 is weighted at one end by the weight 161 so that it will tilt by gravity, as the wheel 151 revolves, into position to properly engage the periphery of the mold wheel, as seen in Fig. 11.

The means for actuating the compressor is shown in Fig. 10, which consists of a powerful spring 170 located in the cage 171 extending radially of the mold wheel that acts against what might be called a piston 172 that is pivoted to the connecting rod 173 which at its outer end is pivoted to the cam bar 174. The other end of said cam bar is pivoted at 175 to the left hand end of the cam 40 so said bar 174 will serve as a continuation of the cam 40 and cause the compressor rollers to ride on said bar 174, and said bar at its lower end is pressed outwardly so that the compressor will be subjected to great strain, for as each compressor passes over the bar 174, it will compress the spring 170 whenever the molds are full of material, and the spring 170 will cause the compressor to press the material into a very dense and compact condition. The material now being pressed in the molds, as the wheel revolves further, the briquet or compressed block in the mold is gradually forced outwardly by the cam plate 42, as seen in Figs. 1 and 10, for near the lower side of the wheel the cam so closely approaches the periphery of the wheel that it forces the compressor entirely through each mold, and in that manner the briquets are discharged upon the conveyer belt 180, see Fig. 1, that runs rearwardly over the roller 181. In that manner the briquets are conveyed away from the machine.
In the modified form shown in Figs. 20 and 21, the mold wheel 232 carries only the two series of molds and does not carry the gear 45 on each side but instead said mold wheel is actuated by a separate gear wheel 245 mounted on the shaft 31 somewhat removed from the mold wheel 232, there being a frame bar 246 intervening between them. In such case, only one train of gears, as seen in Fig. 21 is employed, instead of two sets, like that shown in Fig. 2.

What I claim as my invention and desire to secure by Letters Patent is:

1. A compressing machine including a revoluble wheel, molds mounted radially in the rim thereof with their outer ends open, compressors closing the inner ends of said molds, a hopper through which the periphery of said wheel passes, means for tamping the material in the molds, a scraper for engaging the periphery of said wheel for leveling and removing the surplus material from said molds, a receptacle beside said wheel into which said surplus material is scraped, and a conveyer operating in said receptacle for returning the surplus material back to the hopper.

2. A compressing machine including a revoluble wheel, molds mounted in the rim thereof radially with their outer ends open, radially movable compressors for closing the inner ends of said molds, means for actuating said compressors outwardly for compressing said material, a series of plates revoluble tangentially with said mold wheel for closing the outer ends of the molds while the material is being compressed, and means for yieldingly mounting each of said mold closing plates.

3. A compressing machine including a revoluble wheel, molds mounted in the rim thereof radially with their outer ends open, radially movable compressors for closing the inner ends of said molds, means for actuating said compressors outwardly for compressing said material, and means for closing the outer ends of said molds during the compression of the material therein, said means consisting of a revoluble wheel, radially movable bars mounted thereon, plates pivoted on the outer ends of said bars for engaging and closing the outer ends of said molds, and springs that tend to force said plates outwardly.

4. A compressing machine including a revoluble wheel, molds mounted in the rim thereof radially with their outer ends open, radially movable compressors for closing the inner ends of said molds, means for actuating said compressors outwardly for compressing said material, means for closing the outer ends of said molds during the compression of material therein, said means consisting of a revoluble wheel, radially movable bars mounted therein, plates pivoted on the outer ends of said bars for engaging and closing the outer ends of said molds, springs that tend to force said plates outwardly, and a weight on one end of each of said mold-closing plates for tilting the same as they revolve into proper position for closing the outer ends of the molds.

5. A compressing machine including a revoluble wheel, molds radially mounted in the rim thereof, a hopper through which said wheel revolves, a set of plungers and also a set of tampers mounted in said hopper and adapted to operate upon the material to be compressed in the molds, the plungers being arranged in position to operate thereon in advance of the tampers, whereby the plungers will charge the molds with material and the tampers will compress the same after the molds have been charged.

6. A compressing machine including a revoluble wheel, molds radially mounted in the rim thereof, a hopper through which said wheel revolves, a set of tampers mounted in the hopper, a set of star wheels mounted in the hopper in advance of the tampers, and a set of plungers mounted in the hopper in advance of the star wheels, whereby the plungers will first act upon the material to charge the molds, the star wheels will feed the material to the plungers and the tampers will compress the material in the molds after they have been charged.

7. A compressing machine including a revoluble wheel, molds mounted radially in the rim thereof with their outer ends open, compressors for closing the inner ends of said molds, rollers on the inner ends of the compressors, a cam on which said rollers ride and whereby the compressors are actuated, a rod secured in the rim of the wheel and in guiding connection with each of said compressors for guiding the movement of the same and holding its inner end in position, and a spring on said rod tending to force the compressors inwardly.

8. A compressing machine including a revoluble wheel, molds mounted radially in the rim thereof with their outer ends open, a hopper through which the rim of the wheel moves for charging the molds, a plurality of revoluble star wheels mounted in said hopper for acting upon the material, the said wheels being arranged so that the projections thereof will interengage each other and render said star wheels self cleaning, and means for adjusting one of said star wheels with relation to the mold wheel to regulate the amount of material carried over the mold wheel.

9. A compressing machine including a revoluble wheel, molds mounted radially in the rim thereof with their outer ends open, a hopper through which the rim of the wheel moves, plungers mounted in said hopper for charging the molds with material, and stationary means through which said plungers reciprocate that surrounds the plunger to the inner end thereof when withdrawn for cleaning said plungers as they operate.

10. A compressing machine including a revoluble wheel, means mounted radially in the rim thereof with their outer ends open, means for charging said molds with material to be compressed, tampers mounted in position to compress the material in said molds, said tampers including a cylinder, a piston operable therein with a tamping head on the outer end of the piston rod, and a stop mounted on a screw extending through one end of said cylinder for adjusting the stroke of said tamper.

11. A compressing machine including a revoluble wheel, means mounted radially in the rim thereof with their outer ends open, means for charging said molds with material to be compressed, tampers mounted in position to compress the material in said molds, said tampers including a cylinder, a piston operable therein with a tamping head on the outer end of the piston rod, a stop mounted on a screw extending through one end of said cylinder for adjusting the stroke of said tamper, and a spring in the other end of the cylinder for retarding the movement of the tamper at the end of its stroke, whereby when the molds are not filled with material the concussion of the tamper would be taken up by the spring.

In witness whereof, I have hereunto affixed my signature in the presence of the witnesses herein named.

WILLIAM M. GENTLE.

Witnesses:
  N. ALLEMONG,
  OLIVE BREEDEN.